(12) United States Patent
Shah

(10) Patent No.: US 8,148,866 B2
(45) Date of Patent: Apr. 3, 2012

(54) REGULATED HYBRID PERMANENT MAGNET GENERATOR

(75) Inventor: Mahesh J. Shah, Lindenhurst, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 257 days.

(21) Appl. No.: 12/147,654

(22) Filed: Jun. 27, 2008

(65) Prior Publication Data

US 2009/0322290 A1    Dec. 31, 2009

(51) Int. Cl.
*H02K 3/00* (2006.01)
(52) U.S. Cl. .................................. 310/181; 322/46
(58) Field of Classification Search .............. 310/181, 310/263, 152, 113; 322/6, 46, 59, 27, 28
See application file for complete search history.

(56) References Cited

U.S. PATENT DOCUMENTS

| | | | |
|---|---|---|---|
| 2,990,508 A * | 6/1961 | Thompson | 322/25 |
| 3,041,486 A | 6/1962 | Moffitt | |
| 3,062,979 A | 11/1962 | Jarret | |
| 3,467,844 A | 9/1969 | Bird | |
| 3,470,408 A | 9/1969 | Lewis | |
| 3,594,595 A | 7/1971 | Williams et al. | |
| 3,700,944 A | 10/1972 | Heintz | |
| 3,760,205 A | 9/1973 | Imris | |
| 4,096,624 A | 6/1978 | Gray | |
| 4,481,459 A | 11/1984 | Mehl | |
| 4,587,436 A | 5/1986 | Cronin | |
| 4,625,160 A | 11/1986 | Hucker | |
| 4,639,626 A | 1/1987 | McGee | |
| 4,656,379 A | 4/1987 | McCarty | |
| 4,684,873 A | 8/1987 | Glennon | |
| 4,830,412 A | 5/1989 | Raad | |
| 4,959,605 A | 9/1990 | Vaidya | |
| 5,177,391 A * | 1/1993 | Kusase | 310/263 |
| 5,663,605 A * | 9/1997 | Evans et al. | 310/181 |
| 5,672,925 A * | 9/1997 | Lipo et al. | 310/154.11 |
| 6,509,664 B2 * | 1/2003 | Shah et al. | 310/181 |
| 7,106,030 B2 * | 9/2006 | Isurin et al. | 322/59 |
| 2007/0090713 A1 * | 4/2007 | Arita et al. | 310/181 |

* cited by examiner

*Primary Examiner* — Dang Le
(74) *Attorney, Agent, or Firm* — Carlson, Gaskey & Olds, PC

(57) ABSTRACT

A permanent magnet rotor for an electrical generator has pole pieces with permanent magnets. A control coil is associated with the pole pieces. A current flow through the coils is controlled to achieve a desired output voltage at an output for the generator.

14 Claims, 2 Drawing Sheets

REGULATED HYBRID PERMANENT MAGNET GENERATOR

BACKGROUND OF THE INVENTION

This application relates to a permanent magnet generator, wherein a control coil is provided such that a controlled, relatively constant output voltage can be achieved.

Generators are known, and are utilized to take in a source of rotation, and generate voltage output from that rotation. Typically, a source of rotation is attached to a rotor that has magnetic elements. The source of rotation drives the rotor relative to a stator having stator coils. The relative rotation induces a voltage in the stator coils.

One standard type of generator utilizes a permanent magnet rotor. Another type of generator utilizes field windings that are provided with an exciter field.

Each type of generator has certain deficiencies. A generator utilizing exciter coils may require a relatively large size, and a relatively large source of exciter field voltage.

Conversely, permanent magnet generators typically cannot supply a constant voltage over reasonable speed and load variation.

One typical source of the rotation to drive the rotor is a turbine rotor, such as in a gas turbine engine. Such a source of rotation cannot always provide a constant speed, and thus achieving a constant voltage with a permanent magnet generator driven by turbine rotors may prove challenging. The output voltage in a typical application is not constant over the variation in loads.

SUMMARY OF THE INVENTION

In a disclosed embodiment of this invention, a permanent magnet rotor for a generator is provided with a control coil. A control for the rotor senses the output voltage from a stator. The control coil may be actuated to maintain the output voltage toward a desired output voltage.

These and other features of the present invention can be best understood from the following specification and drawings, the following of which is a brief description.

DETAILED DESCRIPTION OF THE PREFERRED EMBODIMENT

Figure 1:
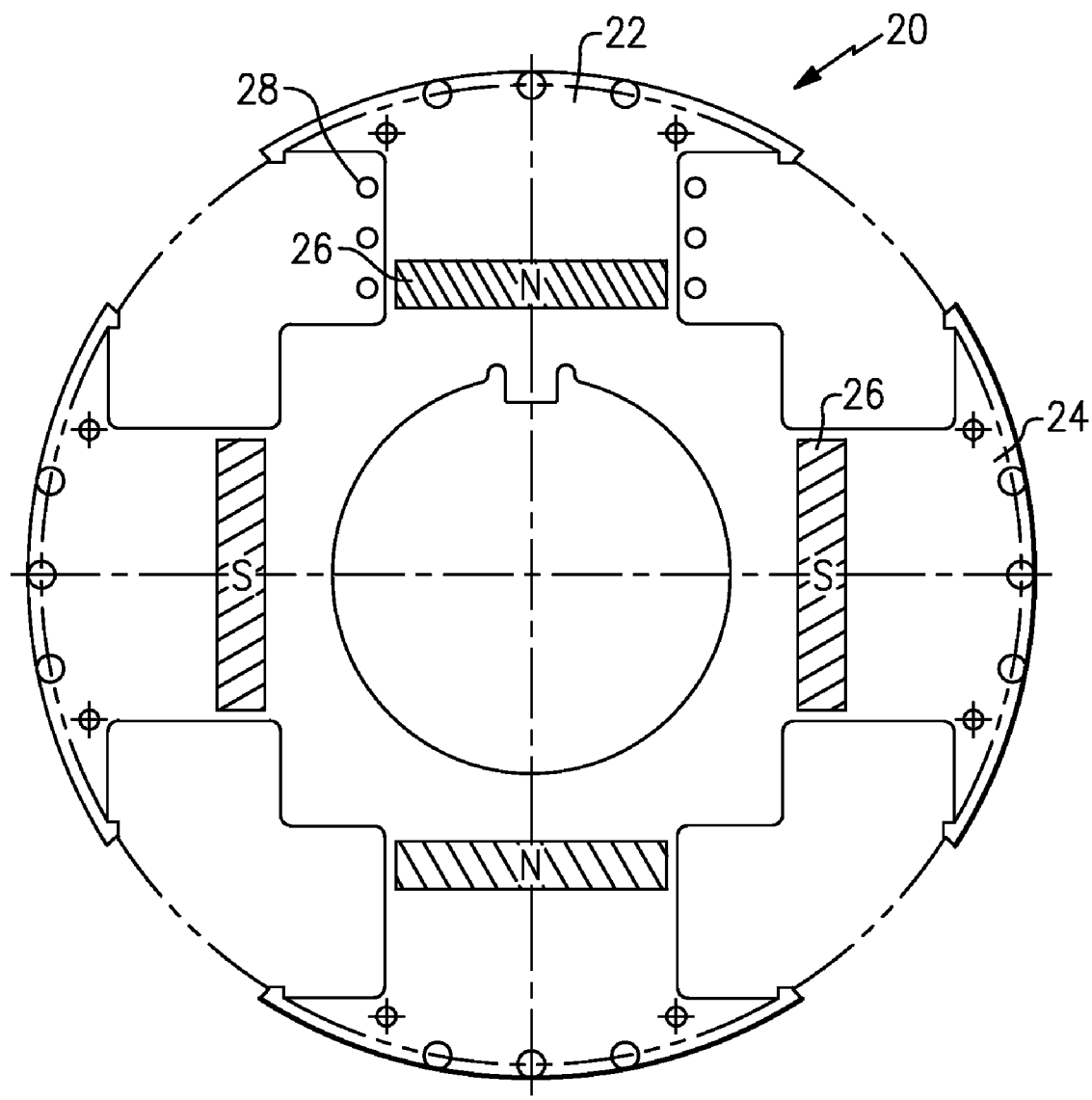
FIG. 1 is a view of a hybrid permanent magnet rotor according to this invention.

A rotor 20 is illustrated in FIG. 1. As shown, a plurality of poles 22 and 24 alternately receive permanent magnets 26. The permanent magnets 26 may be inserted into slots in the poles 22 and 24. Control coils 28 may be wound around the poles 22 and 24.

Figure 2:
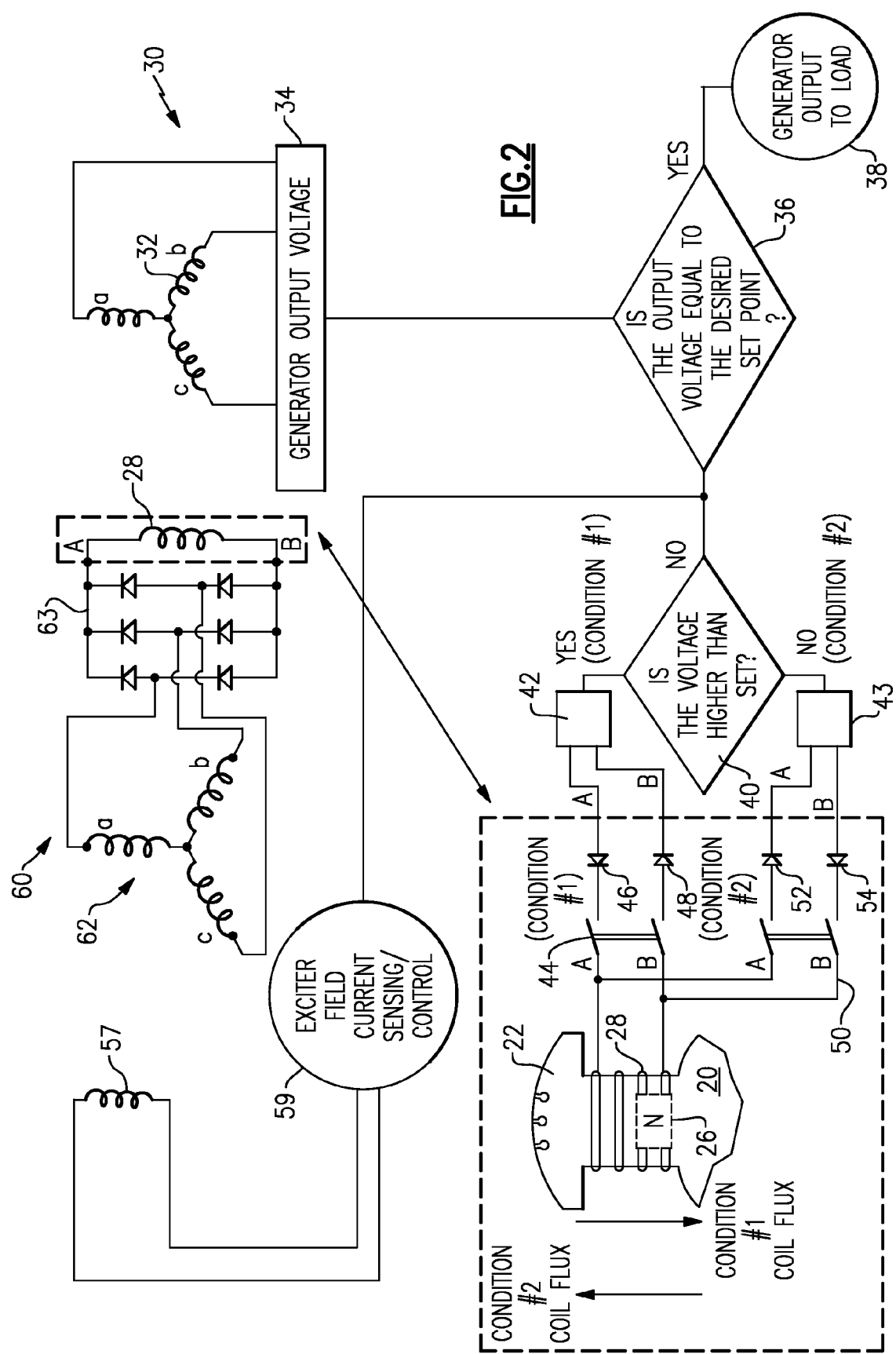
FIG. 2 is a schematic of a control circuit for the present invention.

FIG. 2 shows a control circuit 30 for the hybrid rotor. As known, the stator includes a plurality of coils 32. When the rotor 20 is driven relative to the stator, such as by a turbine in a gas turbine engine, or any prime mover, a voltage output is generated. Element 34 is a control output that supplies an indication of the generated voltage to a logic element 36. If the output voltage is equal (or close) to a desired set point, then the generator output voltage is simply supplied to a load at 38.

If the answer at logic box 36 is no, then a second logic box 40 asks whether the voltage is higher than the set point. Obviously, the question at logic box 40 could be whether the voltage is lower than the set point.

If the voltage is higher than the setpoint, then a switching position 42 provides a control signal from an adjustable exciter field source 57 through an exciter field current sensing control 59. This control signal passes through diodes 46 and 48, and through switches 44 that are closed when logic box 40 detects the voltage is higher than the setpoint. As can be appreciated, the diodes 46 and 48 are in series with the switches 44. This excites the coils 28 in a first direction and creates a flux in an opposite direction to the flux normally created by the permanent magnet 26. This will drop the voltage supplied back through the main stator field 30 such that the voltage supplied to the generator output 38 will approach the desired set point.

If the voltage sensed at logic box 40 is lower than desired, then a switching position 43 is taken. In this position, the positions of the diodes are reversed from those of switching position 42. When the switches 50 are closed, the flow through the diodes 52 and 54 will be in the direction opposite that when the switch is in the position 42. The flux created through the coil 28 will now be in the same direction as the flux created in the permanent magnet 26. Thus, the output voltage at 38 will increase, and approach the desired set point.

In this way, the present invention adjusts the output voltage of a permanent magnet rotor by providing a relatively small exciting field coil and a relatively small exciter field 57.

The circuit portion in 60 is a typical schematic of a conventional synchronous wound field machine, with the exception of the coil 28. It has an exciter armature 62 with its stator 57 and rotating field and a 3-phase main generator (motor) comprising of a wound field rotor and a 3-phase stator. Just like the typical machine performance, the exciter stator field gets its excitation from some source (e.g., an auxiliary PMG or a battery). This then induces ac voltage in exciter armature 62. This exciter output is rectified using the conventional 3-phase full wave rectifier bridge 63 and its dc output is connected to the main rotor field 30 to provide an excitation. This excitation induces the ac voltage into the main 3-phase stator and it provides the output to the load as described as 'generator Output Voltage' 34.

It should be understood that the coil 28 in circuit portion 60 is the same coil shown around the plural pole pieces 22. While only one set of A, B connections are shown, it should be understood that a second set, as shown in the dotted box, would be utilized. Essentially, circuit portion 60 shows how 28 is connected into the remainder of the circuit.

A worker of ordinary skill in the art would understand how to provide an appropriate control to provide the control as shown schematically in FIG. 2.

Although an embodiment of this invention has been disclosed, a worker of ordinary skill in this art would recognize that certain modifications would come within the scope of this invention. For that reason, the following claims should be studied to determine the true scope and content of this invention.

What is claimed is:
1. A permanent magnet generator comprising:
a stator including stator field coils, said stator being connected to supply an output voltage to an output;
a permanent magnet rotor positioned to rotate relative to said stator, said permanent magnet rotor having a plurality of pole pieces, with said plurality of pole pieces being provided with permanent magnets; and a separate control coil associated with each of said plurality of pole pieces and a control for supplying current through said control coils to change the output voltage supplied to the output;

said output voltage supplied to the output being sensed and compared to a desired set point, and the current flow through the control coils being controlled in response to said comparison;

a first switching position being selected to control the current flow through the control coils if the sensed voltage is higher than the desired set point, and a second switching position being selected should the sensed voltage be lower than the desired set point, and said first switching position including closing a first switch and opening a second switch, and said second switching position including opening said first switch, and closing said second switch.

2. The permanent magnet generator as set forth in claim 1, wherein a current flow to said control coils passes through diodes, said diodes configured to reverse the direction of current flow between said first and second switching positions.

3. The permanent magnet generator as set forth in claim 2, wherein said diodes are a first diode pair and a second diode pair, each said diode pair corresponding to one of said first and second switches.

4. The permanent magnet generator as set forth in claim 2, wherein said diodes are mounted in series with both said first and second switches.

5. The permanent magnet generator as set forth in claim 4, wherein said diodes are mounted to be between a current source and said first and second switches.

6. The permanent magnet generator as set forth in claim 1, wherein logic controls determine which of said first and second switches should be opened and closed.

7. The permanent magnet generator as set forth in claim 1, wherein the flow of current through the control coils is in a first direction in the first switching position, and is in a reversed direction in the second switching position.

8. A generator comprising:

a stator including stator field coils, said stator being connected to supply an output voltage to an output;

a rotor positioned to rotate relative to said stator, said rotor having a plurality of poles; and a separate control coil associated with each of said plurality of poles and a control for supplying current through said control coils to change the output voltage supplied to the output;

said output voltage supplied to the output being sensed and compared to a desired set point, and the current flow through the control coils being controlled in response to said comparison;

a first switching position being selected to control the current flow through the control coils if the sensed voltage is higher than the desired set point, and a second switching position being selected should the sensed voltage be lower than the desired set point, and said first switching position including closing a first switch and opening a second switch, and said second switching position including opening said first switch, and closing said second switch.

9. The generator as set forth in claim 8, wherein a current flow to said control coils passes through diodes, said diodes configured to reverse the direction of current flow between said first and second switching positions.

10. The generator as set forth in claim 9, wherein said diodes are a first diode pair and a second diode pair, each said diode pair corresponding to one of said first and second switches.

11. The generator as set forth in claim 9, wherein said diodes are mounted in series with both said first and second switches.

12. The generator as set forth in claim 11, wherein said diodes are mounted to be between a current source and said first and second switches.

13. The generator as set forth in claim 8, wherein logic controls determine which of said first and second switches should be opened and closed.

14. The generator as set forth in claim 8, wherein the flow of current through the control coils is in a first direction in the first switching position, and is in a reversed direction in the second switching position.

\* \* \* \* \*